(12) United States Patent
Cordourier Maruri et al.

(10) Patent No.: US 11,231,905 B2
(45) Date of Patent: Jan. 25, 2022

(54) VEHICLE WITH EXTERNAL AUDIO SPEAKER AND MICROPHONE

(71) Applicant: Intel Corporation, Santa Clara, CA (US)

(72) Inventors: Hector Alfonso Cordourier Maruri, Guadalajara (MX); Sandra Coello Chavarin, Zapopan (MX); Diego Mauricio Cortés Hernández, Zapopan (MX); Rosa Jacqueline Sanchez Mesa, Zapopan (MX); Lizbeth De la Mora Hernandez, Zapopan (MX); Miquel Tlaxcalteco Matus, Tlaquepaque (MX)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/366,491

(22) Filed: Mar. 27, 2019

(65) Prior Publication Data

US 2019/0220248 A1 Jul. 18, 2019

(51) Int. Cl.
| | |
|---|---|
| *G06F 3/16* | (2006.01) |
| *H04R 1/40* | (2006.01) |
| *G06N 3/02* | (2006.01) |
| *G05D 1/02* | (2020.01) |
| *G10L 25/51* | (2013.01) |

(52) U.S. Cl.
CPC .......... *G06F 3/167* (2013.01); *G05D 1/0255* (2013.01); *G06F 3/165* (2013.01); *G06N 3/02* (2013.01); *H04R 1/406* (2013.01); *G10L 25/51* (2013.01); *H04R 2499/13* (2013.01)

(58) Field of Classification Search
CPC ....... G06F 3/167; G06F 3/165; G05D 1/0255; G06N 3/02; G06N 7/005; G06N 20/10; G06N 3/08; H04R 1/406; H04R 2499/13; H04R 2460/07; H04R 2430/23; H04R 29/005; H04R 29/002; G10L 25/51
See application file for complete search history.

(56) References Cited

U.S. PATENT DOCUMENTS

| | | | | |
|---|---|---|---|---|
| 7,203,132 | B2* | 4/2007 | Berger | G01S 5/20 367/129 |
| 7,903,825 | B1* | 3/2011 | Melanson | H03G 3/32 381/57 |
| 8,555,726 | B2* | 10/2013 | Barger | G01H 11/08 73/645 |

(Continued)

FOREIGN PATENT DOCUMENTS

| | | | | |
|---|---|---|---|---|
| CN | 205681611 | * | 5/2016 | ............ H04R 3/00 |
| CN | 205681611 | * | 11/2016 | ............ H04R 3/00 |
| DE | 102020104360 A1 | | 10/2020 | |

*Primary Examiner* — Oyesola C Ojo
(74) *Attorney, Agent, or Firm* — Schwegman Lundberg & Woessner, P.A.

(57) ABSTRACT

Various systems and methods for implementing a vehicle with an external speaker and microphone are described herein. A system includes an audio processor to receive audio data, the audio data sensed by a microphone array installed on the vehicle, the audio data generated by a source outside of the vehicle; an audio classification circuit to analyze the audio data using a machine learning technique to determine a sound event; and a vehicle interface to transmit a message to a vehicle control system, the message based on the sound event.

23 Claims, 7 Drawing Sheets

(56) References Cited

U.S. PATENT DOCUMENTS

| | | | | |
|---|---|---|---|---|
| 2003/0006898 | A1* | 1/2003 | Herzberg | G08B 21/22 |
| | | | | 340/540 |
| 2005/0083404 | A1 | 4/2005 | Pierce | B60R 11/04 |
| | | | | 348/148 |
| 2008/0252444 | A1* | 10/2008 | Batot | G08G 1/205 |
| | | | | 340/539.13 |
| 2011/0038229 | A1* | 2/2011 | Beaucoup | H04N 7/15 |
| | | | | 367/119 |
| 2014/0329492 | A1* | 11/2014 | Hamrick | H04W 4/029 |
| | | | | 455/404.2 |
| 2015/0046022 | A1 | 2/2015 | Bai | G07C 5/008 |
| | | | | 701/31.5 |
| 2015/0244500 | A1* | 8/2015 | Muller | H04L 1/1867 |
| | | | | 375/222 |
| 2015/0258928 | A1* | 9/2015 | Goto | B60Q 1/24 |
| | | | | 701/49 |
| 2015/0336502 | A1* | 11/2015 | Hillis | G06F 3/017 |
| | | | | 701/23 |
| 2016/0155452 | A1* | 6/2016 | Sharifi | G10L 25/51 |
| | | | | 381/56 |
| 2016/0167648 | A1* | 6/2016 | James | G06F 3/017 |
| | | | | 701/28 |
| 2017/0263126 | A1* | 9/2017 | Kim | G10L 25/51 |
| 2017/0359666 | A1* | 12/2017 | Lyren | G10L 25/81 |
| 2018/0302738 | A1* | 10/2018 | Di Censo | G06F 3/165 |
| 2018/0330178 | A1* | 11/2018 | el Kaliouby | B60W 50/082 |
| 2019/0027032 | A1* | 1/2019 | Arunachalam | G08G 1/0965 |
| 2020/0031337 | A1* | 1/2020 | Soltanian | B60W 30/0956 |
| 2020/0066257 | A1* | 2/2020 | Smith | G06F 17/18 |
| 2020/0118418 | A1* | 4/2020 | Benjamin | G08G 1/166 |
| 2020/0126276 | A1* | 4/2020 | Rakshit | G10L 25/51 |
| 2020/0238952 | A1* | 7/2020 | Lindsay | B60R 25/25 |

* cited by examiner

VEHICLE WITH EXTERNAL AUDIO SPEAKER AND MICROPHONE

TECHNICAL FIELD

Embodiments described herein generally relate to vehicle instrumentation systems, and in particular, to a vehicle with external audio speaker and microphone assemblies.

BACKGROUND

In the automotive context, advanced driver assistance systems (ADAS) are those developed to automate, adapt, or enhance vehicle systems to increase safety and provide better driving. In such systems, safety features are designed to avoid collisions and accidents by offering technologies that alert the driver to potential problems, or to avoid collisions by implementing safeguards and taking over control of the vehicle. ADAS relies on various sensors that are able to detect objects and other aspects of their operating environment. Examples of such sensors include visible light cameras, radar, laser scanners (e.g., LiDAR), acoustic (e.g., sonar), and the like.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

Vehicles may include various forward, sideward, and rearward facing sensors. The sensors may include radar, LiDAR (light imaging detection and ranging), cameras, ultrasound, infrared, or other sensor systems. Front-facing sensors may be used for adaptive cruise control, parking assistance, lane departure, collision avoidance, pedestrian detection, and the like. Rear-facing sensors may be used to alert the driver of potential obstacles (e.g., vehicles) when performing lane changes or when backing up at slow speeds (e.g., parking distance monitors).

In the systems described herein, a host vehicle may be equipped with acoustic sensors or speakers in various sensor systems to provide additional information of traffic and other feedback from the environment. Speakers may be used to augment or substitute for conventional horns in vehicles. Speakers may be implemented using a directional, external speaker array. Using directional audio signals provides an improvement over conventional omnidirectional audio signals (e.g., a car horn), by reducing noise pollution and providing specific warnings or information to an intended target. Additionally, the speakers and microphones may be used together for the vehicle to perform echolocation (e.g., sonar).

The improved sensor system described herein realizes advantages in environmental monitoring. Further, the improved sensor system uses advanced filtering and classification methods to identify objects or events that should be brought to a vehicle occupant's attention. The augmented sensor system also provides advantages over sensor systems that do not use audible signal monitoring in that it is able to detect and identify events that are out of view. These advantages and others are described further herein.

Figure 1:
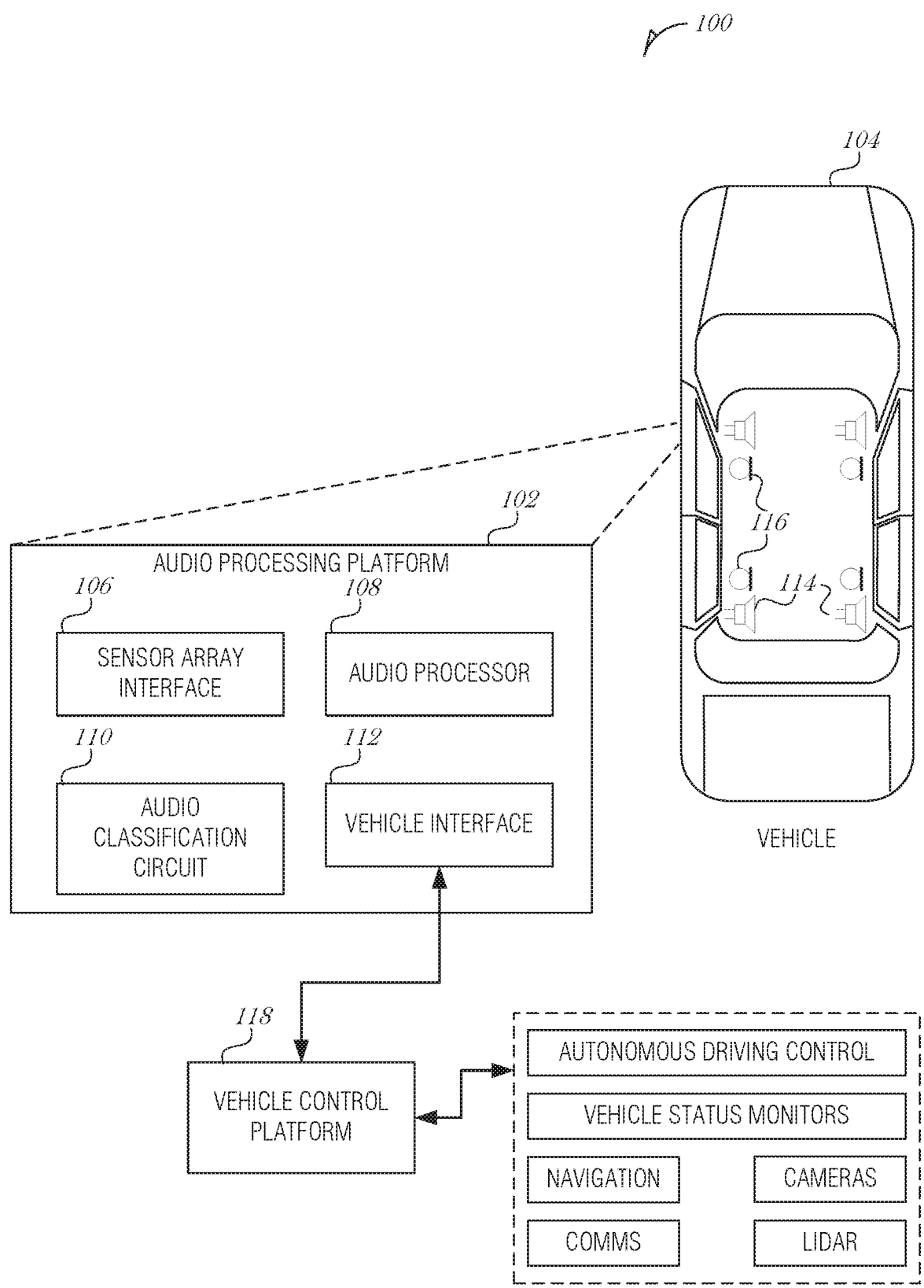
FIG. 1 is a schematic drawing illustrating a system to process audio data to provide improved interactions with the surrounding operating environment, according to an embodiment.

FIG. 1 is a schematic drawing illustrating a system 100 to process audio data to provide improved interactions with the surrounding operating environment, according to an embodiment. FIG. 1 includes an audio processing platform 102 incorporated into the vehicle 104. The audio processing platform 102 includes a sensor array interface 106, an audio processor 108, an audio classification circuit 110, and a vehicle interface 112.

The vehicle 104, which may also be referred to as an "ego vehicle" or "host vehicle", may be any type of vehicle, such as a commercial vehicle, a consumer vehicle, a recreation vehicle, a car, a truck, a motorcycle, a boat, a drone, a robot, an airplane, a hovercraft, or any mobile craft able to operate at least partially in an autonomous mode. The vehicle 104 may operate at some times in a manual mode where the driver operates the vehicle 104 conventionally using pedals, a steering wheel, or other controls. At other times, the vehicle 104 may operate in a fully autonomous mode, where the vehicle 104 operates without user intervention. In addition, the vehicle 104 may operate in a semi-autonomous mode, where the vehicle 104 controls many of the aspects of driving, but the driver may intervene or influence the operation using conventional (e.g., steering wheel) and non-conventional inputs (e.g., voice control).

The vehicle 104 may include one or more speakers 114 that are capable of projecting sound external to the vehicle 104. The speakers 114 may be integrated into cavities in the body of the vehicle 104 with covers (e.g., grilles) that are adapted to protect the speaker driver and other speaker components from foreign objects, while still allowing sound to pass clearly. The grilles may be constructed of plastic, carbon fiber, or other rigid or semi-rigid material that provides structure or weatherproofing to the vehicle's body. The speakers 114 may be incorporated into any portion of the vehicle 104, in an embodiment, the speakers 114 are installed in the roofline of the vehicle 104, to provide better sound projection when the vehicle 104 is amongst other vehicles or other low objects (e.g., while in traffic). The speakers 114 may be provided signals through the sensor array interface 106 from the audio processor 108. The audio processor 108 may drive speakers 114 in a coordinated manner to provide directional audio output.

The vehicle 104 may also include one or more microphones 116 that are capable of detecting environmental sounds around the vehicle 104. The microphones 116 may be installed in any portion of the vehicle 104. In an embodiment, the microphones 116 are installed in the roofline of the vehicle 104. Such placement may provide improved detection capabilities while also reducing ambient background noise (e.g., road and tire noise, exhaust noise, engine noise, etc.). The microphones 116 may be positioned to have variable vertical height. Using vertical differentiation allows the microphones 116 to distinguish sound sources that are above or below the horizontal plane. Variation in the placement of the microphones 116 may be used to further localize sound sources in three-dimensional space. The microphones 116 may be controlled by the audio processor 108 in various ways. For instance, the microphones 116 may be toggled on and off depending whether the speakers 114 are active and emitting sound, in order to reduce or eliminate audio feedback. The microphones 116 may be togged individually, in groups, or all together.

The sensor array interface 106 may be used to provide input or output signaling to the audio processing platform 102 from one or more sensors of a sensor array installed on the vehicle 104. Examples of sensors include, but are not limited to microphones 116; forward, side, or rearward facing cameras; radar; LiDAR; ultrasonic distance measurement sensors; or other sensors. Forward-facing or front-facing is used in this document to refer to the primary direction of travel, the direction the seats are arranged to face, the direction of travel when the transmission is set to drive, or the like. Conventionally then, rear-facing or rearward-facing is used to describe sensors that are directed in a roughly opposite direction than those that are forward or front-facing. It is understood that some front-facing camera may have a relatively wide field of view, even up to 180-degrees. Similarly, a rear-facing camera that is directed at an angle (perhaps 60-degrees off center) to be used to detect traffic in adjacent traffic lanes, may also have a relatively wide field of view, which may overlap the field of view of the front-facing camera. Side-facing sensors are those that are directed outward from the sides of the vehicle 104. Cameras in the sensor array may include infrared or visible light cameras, able to focus at long-range or short-range with narrow or large fields of view.

The vehicle 104 may also include various other sensors, such as driver identification sensors (e.g., a seat sensor, an eye tracking and identification sensor, a fingerprint scanner, a voice recognition module, or the like), occupant sensors, or various environmental sensors to detect wind velocity, outdoor temperature, barometer pressure, rain/moisture, or the like.

Sensor data is used to determine the vehicle's operating context, environmental information, road conditions, travel conditions, or the like. The sensor array interface 106 may communicate with another interface, such as an onboard navigation system, of the vehicle 104 to provide or obtain sensor data. Components of the audio processing platform 102 may communicate with components internal to the audio processing platform 102 or components that are external to the platform 102 using a network, which may include local-area networks (LAN), wide-area networks (WAN), wireless networks (e.g., 802.11 or cellular network), ad hoc networks, personal area networks (e.g., Bluetooth), vehicle-based networks (e.g., Controller Area Network (CAN) BUS), or other combinations or permutations of network protocols and network types. The network may include a single local area network (LAN) or wide-area network (WAN), or combinations of LANs or WANs, such as the Internet. The various devices coupled to the network may be coupled to the network via one or more wired or wireless connections.

The audio processing platform 102 may communicate with a vehicle control platform 118. The vehicle control platform 118 may be a component of a larger architecture that controls various aspects of the vehicle's operation. The vehicle control platform 118 may have interfaces to autonomous driving control systems (e.g., steering, braking, acceleration, etc.), comfort systems (e.g., heat, air conditioning, seat positioning, etc.), navigation interfaces (e.g., maps and routing systems, positioning systems, etc.), collision avoidance systems, communication systems, security systems, vehicle status monitors (e.g., tire pressure monitor, oil level sensor, speedometer, etc.), and the like. Using the audio processing platform 102, the vehicle control platform 118 may control one or more subsystems. For instance, the audio processing platform 102 may be used in a sensor fusion mechanism with other sensors (e.g., cameras, LiDAR, GPS, etc.), where the audio signals are used to augment, corroborate, or otherwise assist in object type detection, object identification, object position or trajectory determinations, and the like.

Sensor data, such as sounds that are detected by microphones 116 installed on or around the vehicle 104, are provided to the audio processor 108, which may preprocess the input audio signal. For instance, the audio processor 108 may implement a low-pass filter, a high-pass filter, an amplifier, an analog-to-digital converter, or other audio circuitry in the audio processor 108. The audio processor 108 may also perform feature extraction of the input audio stream. Features may then be provided to the audio classification circuit 110 for identification.

The audio classification circuit 110 may be constructed using one of several types of machine learning, such as artificial neural networks (ANN), support vector machines (SVM), Gaussian mixture model (GMM), deep learning, or the like. Using the features provided by the audio processor 108, the audio classification circuit 110 attempts to identify the input audio. The audio classification circuit 110 returns a possible classification to the audio processor 108. While the audio classification circuit 110 is in the vehicle 104 in the example shown in FIG. 1, it is understood that some or all of the classification process may be offboard, such as at a network-accessible server (e.g., cloud service). For example, feature extraction may be performed locally at the vehicle 104 to reduce the amount of data to be sent to a cloud service.

Based on the possible classification, the audio processor 108 may initiate one or more responsive activities. For instance, if the audio classification circuit 110 identifies a police siren in the input audio, then the audio processor 108 may transmit a message through the vehicle interface 112. The vehicle interface 112 may be directly or indirectly connected to an onboard vehicle infotainment system or other vehicle system. In response to the message the vehicle control platform 118 or another component in the vehicle 104 may generate a notification to be presented to an occupant of the vehicle 104 on a display, with an audio cue, using haptic feedback in the seat or steering wheel, or the like. For example, when a police siren is detected by the audio classification circuit 108, an icon or other graphic representation may be presented on an in-dash display in the vehicle 104 to alert the occupant or operator of the vehicle 104 that an emergency vehicle is nearby. The message may also initiate other actions to cause the vehicle operator to provide attention to the detected situation, such as muting music playback, interrupting a phone call, or autonomously navigating the vehicle 104 toward the side of the road and slowing the vehicle 104 to a stop. Other autonomous vehicle actions may be initiated depending on the type, severity, location, or other aspects of an event detected with the audio processing platform 102.

Figure 2:
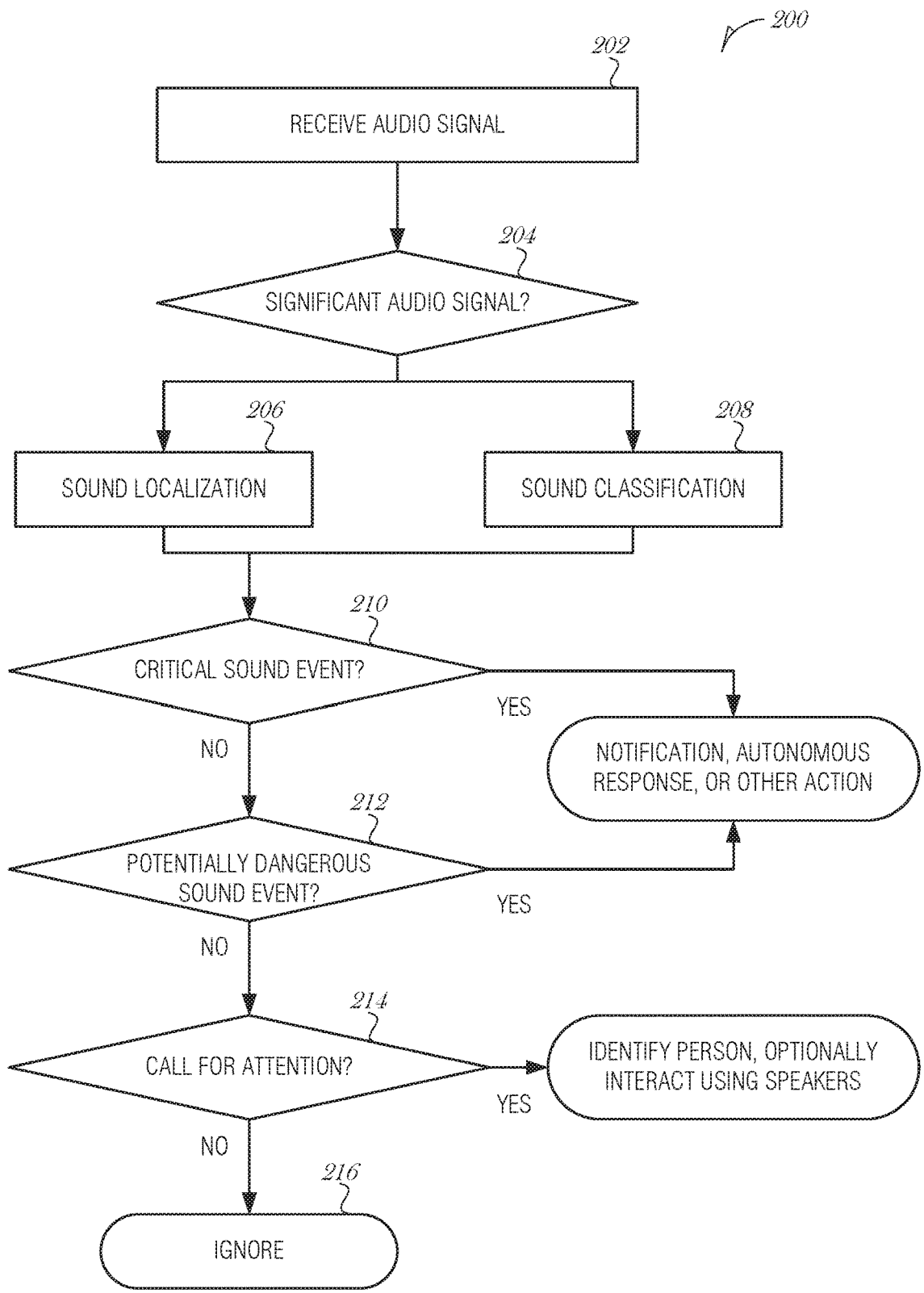
FIG. 2 is a flowchart illustrating an audio event detection process, according to an embodiment.

FIG. 2 is a flowchart illustrating an audio event detection process 200, according to an embodiment. At 202, a microphone array detects ambient audio signals. At 204, it is determined whether a significant audio signal is captured. This may be performed by the audio processor 108, for example, and the significance of the audio signal may be based on a threshold volume, repeating audio, or the like. When a significant (e.g., non-inconsequential) audio signal is detected, then at 206, the location or direction of the sound event source corresponding to the audio signal is determined using a sound localization process. Directionality may be determined using analysis across the microphones using time lag between when each microphone detected the audio signal, the wavelength of the received audio signal, or the like.

At 208, a classification analysis is performed on the audio signal. As described above, a feature set may be extracted from the audio signal and passed to a classifier. The classifier (e.g., audio classification circuit 110) may use a machine learning technique in an attempt to identify the audio signal and a corresponding sound event type.

Using the sound event source and the sound event type, the process 200 continues and determines whether the sound event corresponds to a critical event (e.g., ambulance or police siren, car collision, gun fire, etc.) (operation 210). If the sound event is a critical event, then a message may be generated and passed to the appropriate systems within the vehicle 104 or to external entities (e.g., report gun fire to local law enforcement). The message may be used to cause the in-dash infotainment system in the vehicle 104 to present a warning to an operator or occupant of the vehicle 104, cause an autonomous vehicle maneuver (e.g., slowing down and maneuvering to the shoulder), or other actions. For instance, the message may cause an external notification to occur to alert or inform local law enforcement, emergency roadside assistance, family members, health care workers, or the like.

If the sound event is not considered a critical event, then at operation 212, the process 200 determines whether the sound event is a potentially dangerous event. A potentially dangerous event is one that may involve danger to the vehicle 104, its occupants, or to other vehicles or pedestrians around the vehicle 104. For instance, if the sound event indicates that children are playing near the front of the vehicle 104, then an informational warning may be provided to the operator of the vehicle 104 to alert them of a potentially dangerous situation. Such audio-based alert systems may augment motion detection systems and alert the operator of pedestrians, animals, vehicles, or other objects that the vehicle 104 may collide with. When a potentially dangerous event is detected, then a notification event may be generated to initiate a notification to the operator or occupant of the vehicle 104, perform an autonomous action of the vehicle 104, or other responsive activities. The notification may be audible (e.g., a warning chime or verbal warning), haptic (e.g., vibrating seats or steering wheel), visual (e.g., a warning indicator light in an in-dash display), or the like.

If the sound event is not considered a critical or potentially dangerous event, then at operation 214, the process 200 determines whether the sound event is a call for attention. For example, the sound event may be a person near the vehicle 104 calling for the vehicle operator's attention. Trigger phrases such as "hey, you," or "wait, stop!" may be used to identify a call for attention. Other phrases may be recognized based on how the machine learning technique is trained. In response to determining that the sound event is a call for attention, then various responsive actions may be initiated. A message may be generated to initiate an alert to the operator or occupant of the vehicle 104.

Additionally, a person identification routine may be initiated. The person identification routine may access one or more images captured by cameras installed in or around the vehicle 104 (e.g., in the sensor array). Facial recognition may be used to identify the person calling for attention. Alternatively, the person identification routine may be performed using voice recognition. Voice recognition attempts to match the utterance with one or more previously-obtained utterances that have already been correlated to specific people. Using the person identification routine allows for additional information to be presented to the operator or occupant of the vehicle 104. With external speakers (e.g., speakers 114), an occupant or operator of the vehicle 104, or the vehicle 104 itself, may interact with the person that was calling for attention. Using directional audio output, such as with a beamforming technique, communication with the person external to the vehicle 104 may be largely directed, avoiding broadcasting the conversation in all directions, which may confuse or annoy other pedestrians. The direction of the speaker output may be generally aligned with the source of the audio signal as detected by the microphones and audio processor 108.

If the sound event is not recognized by the audio classification circuit, then the audio signal is ignored (state 216). The operator or occupant of the vehicle 104 may perform training by identifying the audio signal and labeling it. The audio classification circuit 110 may use the labeled data to adjust parameters in its model to account for similar audio signals in later classifications.

Events may be configured by a user or entity a vehicle manufacturer, system designer, etc.) to separate events to be identified as "critical" versus those to be identified as "potentially dangerous." Events may be regional or otherwise geographically customized so that sound events that are considered to be "critical" in some areas of the world may be considered only "potentially dangerous" in other parts of the world.

Figure 3:
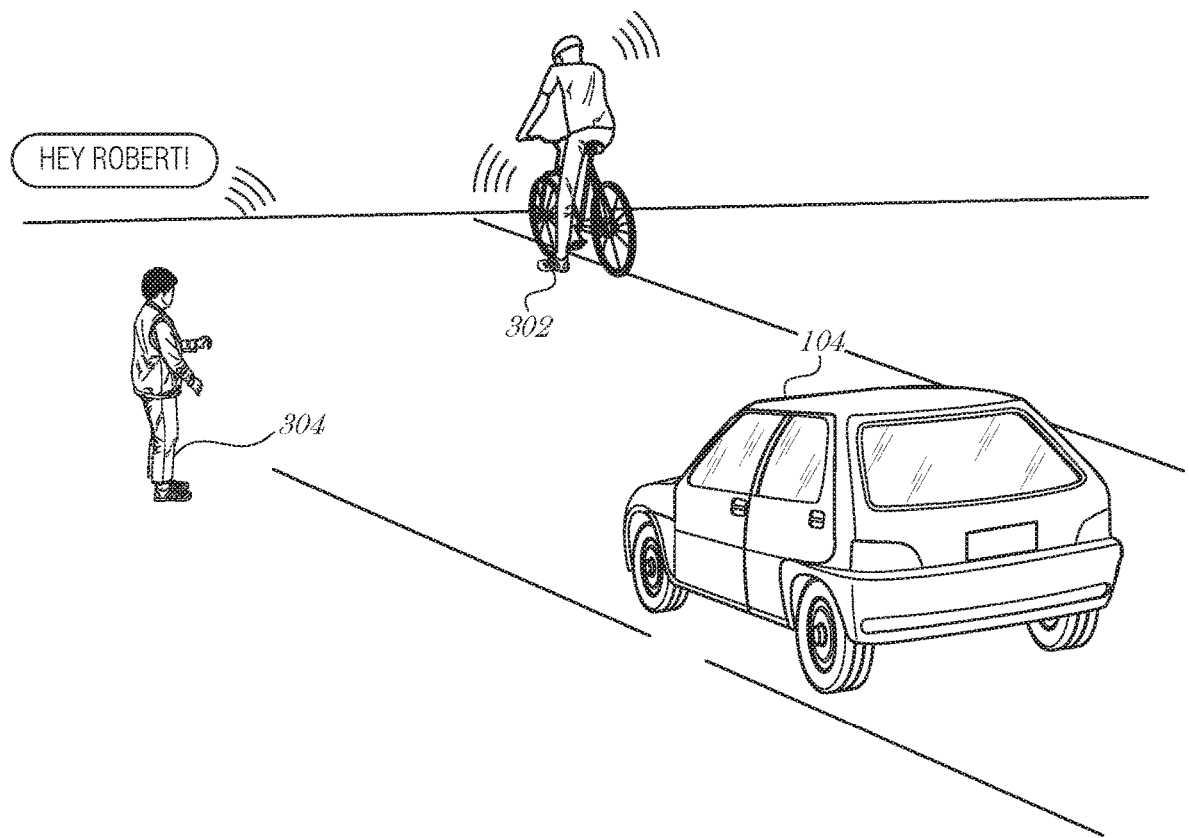
FIG. 3 is a diagram illustrating an operating environment of a vehicle, according to an embodiment.

FIG. 3 is a diagram illustrating an operating environment 300 of the vehicle 104, according to an embodiment. A person 302 may be biking near the vehicle 104 at a distance where typical collision warning systems may not detect them. The person 302 may be singing along with music playing on their headphones. The vehicle 104 may detect the audio signal and determine that it is a potentially dangerous situation and may notify the driver of the vehicle 104 of the person's position and existence.

Another person 304 may hail the vehicle 104 or an occupant of the vehicle 104. In this example, the person 304 may recognize the driver and call out "Hey, Robert!" to get the driver's attention. This utterance may be recognized by the vehicle's audio processing platform and cause a notification event to notify the driver.

Figure 4:
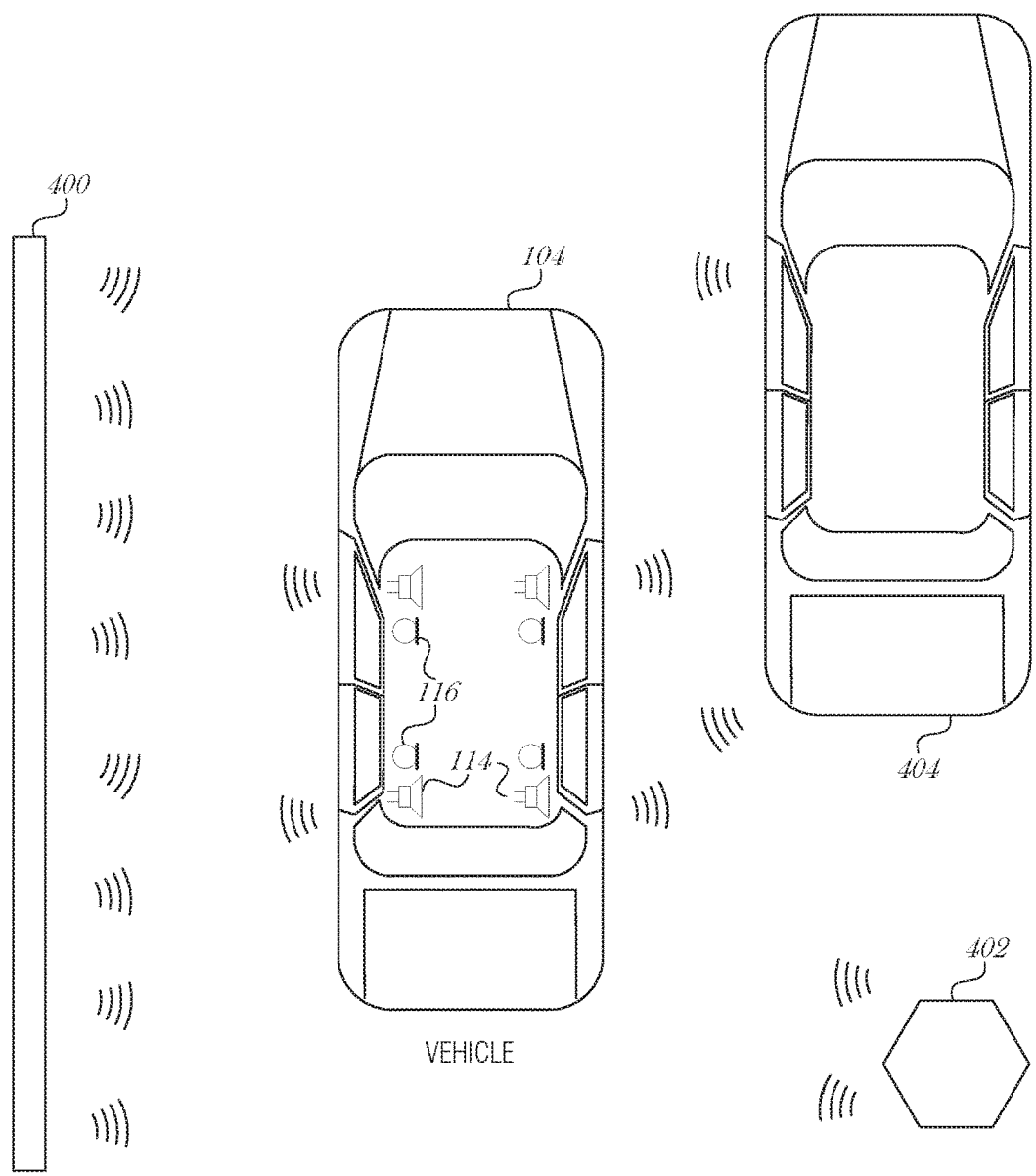
FIG. 4 is a diagram illustrating an assistive environmental sensing mechanism, according to an embodiment.

FIG. 4 is a diagram illustrating an assistive environmental sensing mechanism, according to an embodiment. Speakers 114 that are incorporated into the vehicle 104 are used to emit audio signals, which are reflected by surfaces of nearby objects 400, 402, and 404. The reflected audio signals are sensed by microphones 116 that are also incorporated into the vehicle. Using principles of echolocation, the vehicle 104 is able to detect objects 400, 402, and 404 around it.

Such a system may not be used as a substitute for optical sensing systems, but to complement them in situations in which such systems might be compromised by occlusions or interfering signals produced by weather conditions or other causes. The audio-based assistive environmental sensing system may be used in conjunction with one or more other sensor systems in a sensor fusion process.

For example, a vehicle may be equipped with various sensing systems, such as visible light cameras, LIDAR, or the like. Classifiers may be used to analyze images or other sensor data to perform various data classifications. In certain environments, some sensing systems may not be effective. For instance, when operating a vehicle in a badly light environment, visible light camera images may not have enough details for a classifier to detect object edges. The result is that the classifier may provide object identification with low probabilities. In this case, using a sound based sensing mechanism may help augment the object identification classifier.

In general, sound-based sensing capabilities may be automatically initiated if the classifiers of the other modalities (cameras, LIDAR, etc.) are obtaining results with low probability rates (e.g., higher uncertainty), which is something that usually happens when the input information is noisy or dim (badly lit, with interference, partially obstructed, etc.).

Vehicles may each use a distinct frequency, tone pattern, or other distinctive characteristic for its audio excitation signal. In this way, several vehicles in close proximity may use the assistive environmental sensing mechanism.

Audible frequencies may be used for the assistive environmental sensing, which may sound like a series of clicks, thumps, or chirps, depending on the duration, frequency, and pattern of the audio excitation signal.

Figure 5:
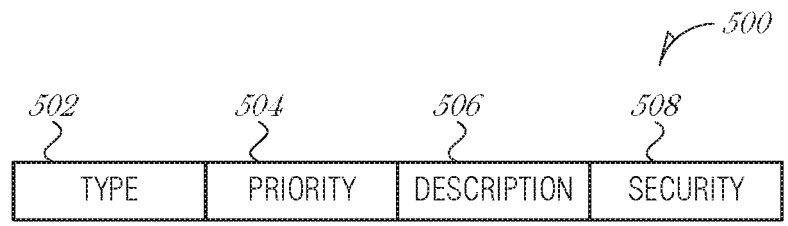
FIG. 5 is diagram lustrating a message structure, according to an embodiment.

FIG. 5 is diagram illustrating a message structure 500, according to an embodiment. The message structure 500 is output by the audio processing platform 102 and may be transmitted to the vehicle control platform 118 or other components in the vehicle 104. The message structure 500 includes a message type field 502, a message priority field 504, a message description field 506, and a message security field 508. The message type field 502 is used to store the type of message, such as an informational message, a status message, a warning message, or the like. The message priority field 504 is used to store an enumerated priority of the message, such as on a scale of 1-10 or 1-100 or the like. The message description field 506 is used to store a text description of the message. The message security field 508 is used to store access rights, such as with an access control list (ACL). It is understood that the message structure 500 illustrated in FIG. 5 is one example of possible message structures, and that other message structures may be used.

In some embodiments, the audio processing platform 102 acts as another electronic control unit (ECU) on a controller area network bus (CAN BUS) within a vehicle. In such a configuration, messages may be broadcast throughout the system using the control and signaling protocols of the CAN BUS. For instance, the message structure 500 may be configured to fit within a data field of a CAN BUS frame format.

Figure 6:
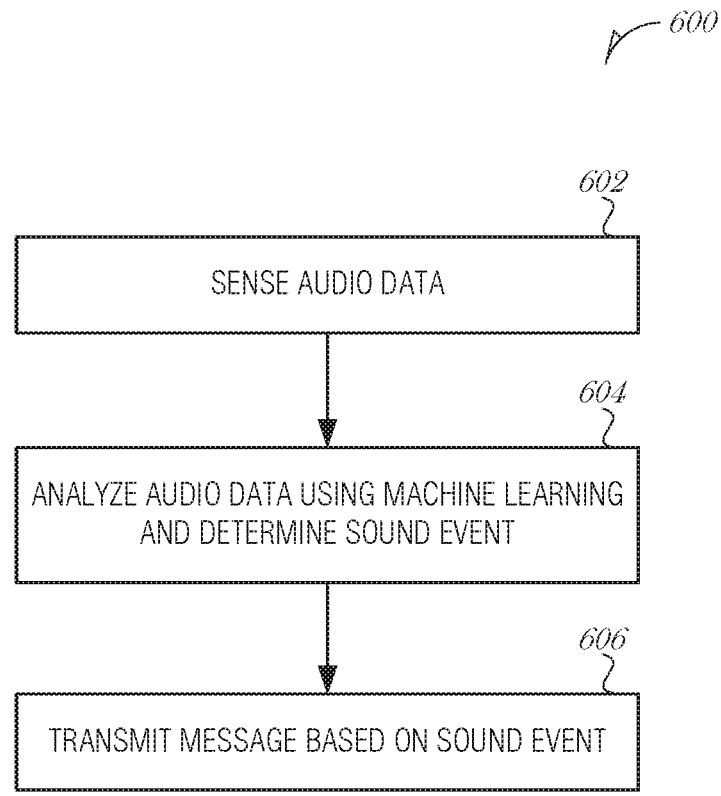
FIG. 6 is a flowchart illustrating a method for audio event detection, according to an embodiment.

FIG. 6 is a flowchart illustrating a method 600 for audio event detection, according to an embodiment. At 602, audio data, sensed by a microphone array installed on a vehicle, is received at an audio processor, where the audio data generated by a source outside of the vehicle. In an embodiment, the sound event represents a critical event. In an embodiment, the sound event represents a potentially dangerous event.

At 604, the audio data is analyzed using a machine learning technique to determine a sound event. In an embodiment, the machine learning technique comprises an artificial neural network. In an embodiment, the machine learning technique comprises a support vector machine.

At 606, a message is transmitted to a vehicle control system, the message based on the sound event. In an embodiment, transmitting the message comprises transmitting the message using a Controller Area Network bus.

In an embodiment, the vehicle control system performs a responsive action based on the message. In a further embodiment, the responsive action comprises an autonomous vehicle maneuver. In a related embodiment, the responsive action comprises displaying an alert to an occupant of the vehicle. In a related embodiment, the responsive action comprises transmitting a distress call to an emergency response entity. In a related embodiment, the responsive action comprises initiating a person identification routine, the person identification routine to identify a person associated with the audio data.

In an embodiment, the method 600 includes transmitting a directed audio signal to the person associated with the audio data. For instance, the audio signal may use beamforming to localize and direct the audio signal to a region around the person.

Figure 7:
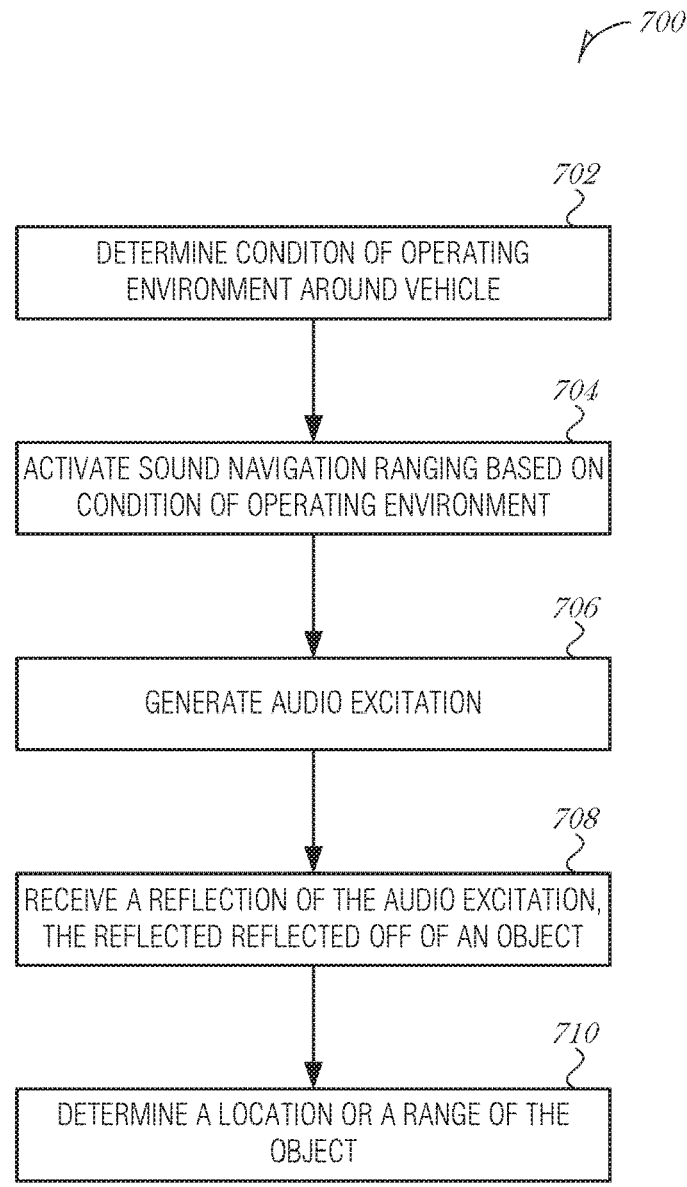
FIG. 7 is a flowchart illustrating a method of using sound navigation ranging in a vehicle to augment other sensing systems, according to an embodiment.

FIG. 7 is a flowchart illustrating a method 700 of using sound navigation ranging in a vehicle to augment other sensing systems, according to an embodiment. At 702, a condition of an operating environment of the vehicle is determined using a sensing system that is not sound navigation ranging. Other types of sensing system that are installed in the vehicle may be used to determine the conditions of the operating environment, such as temperature sensors, humidity sensors, rain sensors, visible light cameras, LIDAR, or the like. Using these sensors, it may be determined that they are not providing the sensing capabilities needed for safe or effective vehicle operation, so the sound navigation ranging may be used to augment the other sensors.

In an embodiment, determining the condition of the operating environment of the vehicle includes determining the condition of the operating environment using a visible light camera to capture image data and analyzing the image, data to determine the condition. In a related embodiment, determining the condition of the operating environment of the vehicle includes determining the condition of the operating environment using a light ranging sensor to capture image data and analyzing the image data to determine the condition.

At 704, based on the condition of the operating environment, the sound navigation ranging is activated. In an embodiment, the condition of the operating environment comprises a fog, rain, or snow event.

In an embodiment, determining the condition of the operating environment and activating the sound navigation ranging based on the condition of the operating environment includes using a machine learning classifier to process sensor data with a classification, the sensor data including image data, and the machine learning classifier to return a probability of a result of the classification. It is then determined whether the probability of the result is lower than a threshold and if so, the sound navigation ranging is activated.

At 706, in response to the sound navigation ranging being activated, an audio excitation is generated from a speaker configured to be installed in the vehicle. In an embodiment, the audio excitation includes a frequency and a pattern, where at least one of the frequency or pattern are randomly assigned to the vehicle. In a further embodiment, the frequency is in an audible frequency range. In a further embodiment, the frequency is within a range of about 20 hertz to 20,000 hertz.

At 708, a reflection is received, the reflection being the audio excitation after being reflected from an object external to the vehicle, the reflection corresponding to the audio excitation.

At 710, the reflection is analyzed to determine a location or a range of the object with respect to the vehicle.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction/instructions on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

Figure 8:
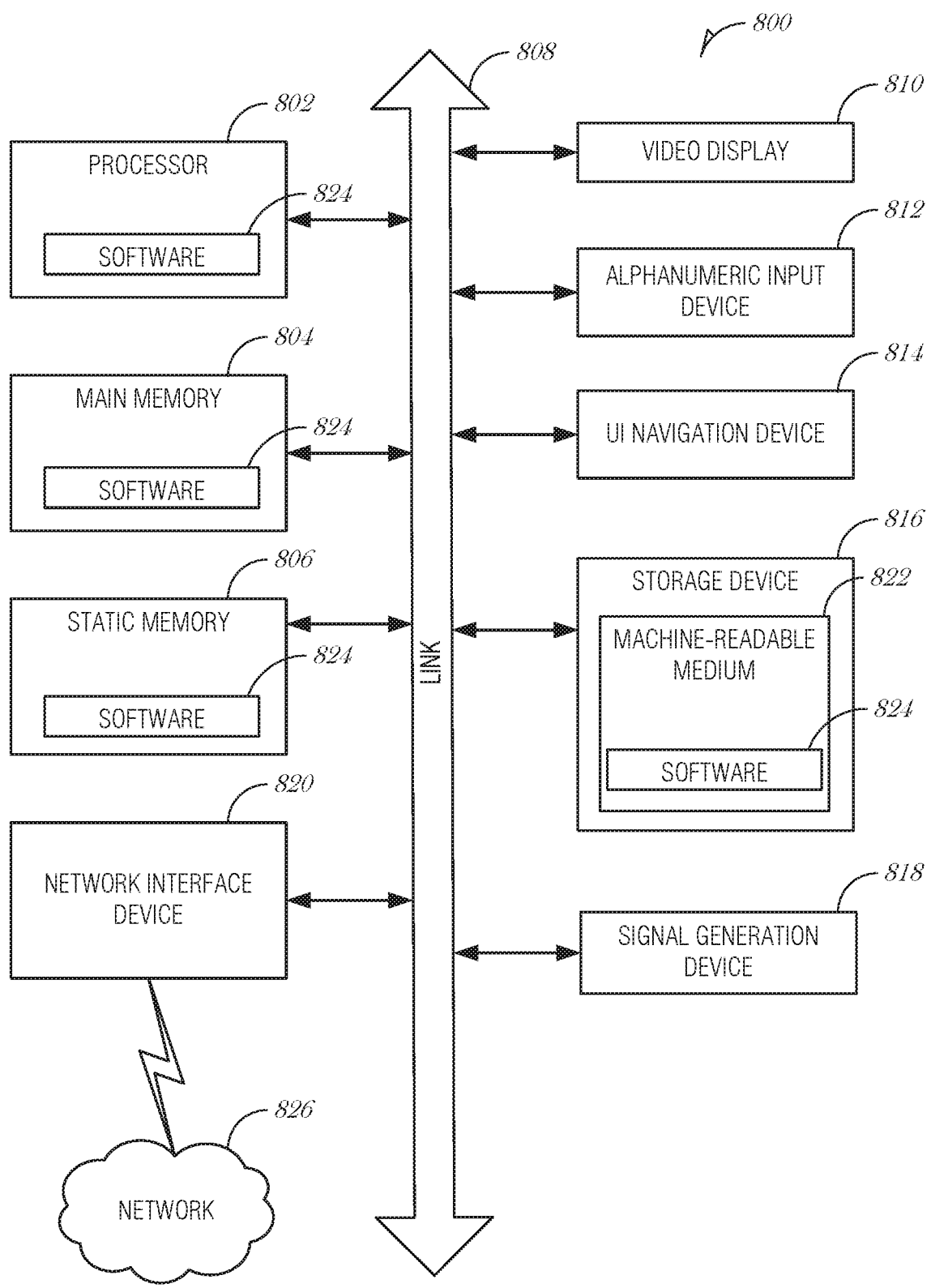
FIG. 8 is a block diagram illustrating an example machine upon which any one or more of the techniques (e.g., methodologies) discussed herein may perform, according to an embodiment.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture FIG. 8 is a block diagram illustrating a machine in the example form of a computer system 800, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a vehicle subsystem, a personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 800 includes at least one processor 802 (e.g., a central processing unit (CPU), a graphics processing unit (GPU) or both, processor cores, compute nodes, etc.), a main memory 804 and a static memory 806, which communicate with each other via a link 808 (e.g., bus). The computer system 800 may further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are incorporated into a touch screen display. The computer system 800 may additionally include a storage device 816 (e.g., a drive unit), a signal generation device 818 (e.g., a speaker), a network interface device 820, and one or more sensors (not shown), such as a global positioning system (GPS) sensor, compass, accelerometer, pyrometer, magnetometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 is a system for audio events detection in a vehicle, the system comprising: an audio processor to receive audio data, the audio data sensed by a microphone array installed on the vehicle, the audio data generated by a source outside of the vehicle; an audio classification circuit to analyze the audio data using a machine learning technique to determine a sound event; and a vehicle interface to transmit a message to a vehicle control system, the message based on the sound event.

In Example 2, the subject matter of Example 1 includes, wherein the sound event represents a critical event.

In Example 3, the subject matter of Examples 1-2 includes, wherein the sound event represents a potentially dangerous event.

In Example 4, the subject matter of Examples 1-3 includes, wherein the machine learning technique comprises an artificial neural network.

In Example 5, the subject matter of Examples 1-4 includes, wherein the machine learning technique comprises a support vector machine.

In Example 6, the subject matter of Examples 1-5 includes, wherein transmitting the message comprises transmitting the message using a Controller Area Network bus.

In Example 7, the subject matter of Examples 1-6 includes, wherein the vehicle control system performs a responsive action based on the message.

In Example 8, the subject matter of Example 7 includes, wherein the responsive action comprises an autonomous vehicle maneuver.

In Example 9, the subject matter of Examples 7-8 includes, wherein the responsive action comprises displaying an alert to an occupant of the vehicle.

In Example 10, the subject matter of Examples 7-9 includes, wherein the responsive action comprises transmitting a distress call to an emergency response entity.

In Example 11, the subject matter of Examples 7-10 includes, wherein the responsive action comprises initiating a person identification routine, the person identification routine to identify a person associated with the audio data.

In Example 12, the subject matter of Example 11 includes, wherein the audio processor is to cause the transmission of a directed audio signal to the person associated with the audio data.

Example 13 is a method for audio events detection in a vehicle, the method comprising: receiving audio data, the audio data sensed by a microphone array installed on the vehicle, the audio data generated by a source outside of the vehicle; analyzing the audio data using a machine learning technique to determine a sound event; and transmitting a message to a vehicle control system, the message based on the sound event.

In Example 14, the subject matter of Example 13 includes, wherein the sound event represents a critical event.

In Example 15, the subject matter of Examples 13-14 includes, wherein the sound event represents a potentially dangerous event.

In Example 16, the subject matter of Examples 13-15 includes, wherein the machine learning technique comprises an artificial neural network.

In Example 17, the subject matter of Examples 13-16 includes, wherein the machine learning technique comprises a support vector machine.

In Example 18, the subject matter of Examples 13-17 includes, wherein transmitting the message comprises transmitting the message using a Controller Area Network bus.

In Example 19, the subject matter of Examples 13-18 includes, wherein the vehicle control system performs a responsive action based on the message.

In Example 20, the subject matter of Example 19 includes, wherein the responsive action comprises an autonomous vehicle maneuver.

In Example 21, the subject matter of Examples 19-20 includes, wherein the responsive action comprises displaying an alert to an occupant of the vehicle.

In Example 22, the subject matter of Examples 19-21 includes, wherein the responsive action comprises transmitting a distress call to an emergency response entity.

In Example 23, the subject matter of Examples 19-22 includes, wherein the responsive action comprises initiating a person identification routine, the person identification routine to identify a person associated with the audio data.

In Example 24, the subject matter of Example 23 includes, transmitting a directed audio signal to the person associated with the audio data.

Example 25 is at least one machine-readable medium including instructions, which when executed by a machine, cause the machine to perform operations of any of the methods of Examples 13-24.

Example 26 is an apparatus comprising means for performing any of the methods of Examples 13-24.

Example 27 is an apparatus for audio events detection in a vehicle, the apparatus comprising: means for receiving audio data, the audio data sensed by a microphone array installed on the vehicle, the audio data generated by a source outside of the vehicle; means for analyzing the audio data using a machine learning technique to determine a sound event; and means for transmitting a message to a vehicle control system, the message based on the sound event.

In Example 28, the subject matter of Example 27 includes, wherein the sound event represents a critical event.

In Example 29, the subject matter of Examples 27-28 includes, wherein the sound event represents a potentially dangerous event.

In Example 30, the subject matter of Examples 27-29 includes, wherein the machine learning technique comprises an artificial neural network.

In Example 31, the subject matter of Examples 27-30 includes, wherein the machine learning technique comprises a support vector machine.

In Example 32, the subject matter of Examples 27-31 includes, wherein the means for transmitting the message comprise means for transmitting the message using a Controller Area Network bus.

In Example 33, the subject matter of Examples 27-32 includes, wherein the vehicle control system performs a responsive action based on the message.

In Example 34, the subject matter of Example 33 includes, wherein the responsive action comprises an autonomous vehicle maneuver.

In Example 35, the subject matter of Examples 33-34 includes, wherein the responsive action comprises displaying an alert to an occupant of the vehicle.

In Example 36, the subject matter of Examples 33-35 includes, wherein the responsive action comprises transmitting a distress call to an emergency response entity.

In Example 37, the subject matter of Examples 33-36 includes, wherein the responsive action comprises initiating a person identification routine, the person identification routine to identify a person associated with the audio data.

In Example 38, the subject matter of Example 37 includes, means for transmitting a directed audio signal to the person associated with the audio data.

Example 39 is at least one machine-readable medium including instructions for audio events detection in a vehicle, the instructions when executed by a machine, cause the machine to perform the operations comprising: receiving audio data, the audio data sensed by a microphone array installed on the vehicle, the audio data generated by a source outside of the vehicle; analyzing the audio data using a machine learning technique to determine a sound event; and transmitting a message to a vehicle control system, the message based on the sound event.

In Example 40, the subject matter of Example 39 includes, wherein the sound event represents a critical event.

In Example 41, the subject matter of Examples 39-40 includes, wherein the sound event represents a potentially dangerous event.

In Example 42, the subject matter of Examples 39-41 includes, wherein the machine learning technique comprises an artificial neural network.

In Example 43, the subject matter of Examples 39-42 includes, wherein the machine learning technique comprises a support vector machine.

In Example 44, the subject matter of Examples 39-43 includes, wherein transmitting the message comprises transmitting the message using a Controller Area Network bus.

In Example 45, the subject matter of Examples 39-44 includes, wherein the vehicle control system performs a responsive action based on the message.

In Example 46, the subject matter of Example 45 includes, wherein the responsive action comprises an autonomous vehicle maneuver.

In Example 47, the subject matter of Examples 45-46 includes, wherein the responsive action comprises displaying an alert to an occupant of the vehicle.

In Example 48, the subject matter of Examples 45-47 includes, wherein the responsive action comprises transmitting a distress call to an emergency response entity.

In Example 49, the subject matter of Examples 45-48 includes, wherein the responsive action comprises initiating a person identification routine, the person identification routine to identify a person associated with the audio data.

In Example 50, the subject matter of Example 49 includes, transmitting a directed audio signal to the person associated with the audio data.

Example 51 is a system of using sound navigation ranging in a vehicle to augment other sensing systems, the system comprising: a processor subsystem, which when configured h instructions stored in a machine-readable medium, perform the operations comprising: determining a condition of an operating environment of the vehicle using a sensing system that is not sound navigation ranging; activating the sound navigation ranging based on the condition of the operating environment; generating an audio excitation from a speaker installed in the vehicle, the generation of the audio excitation in response to the sound navigation ranging being activated; receiving a reflection, the reflection being the audio excitation after being reflected from an object external to the vehicle, the reflection corresponding to the audio excitation; and analyzing the reflection to determine a location or a range of the object with respect to the vehicle.

In Example 52, the subject matter of Example 51 includes, wherein determining the condition of the operating environment and activating the sound navigation ranging based on the condition of the operating environment comprises: using a machine learning classifier to process sensor data with a classification, the sensor data including image data, and the machine learning classifier to return a probability of a result of the classification; determining that the probability of the result is lower than a threshold; and activating the sound navigation ranging based on the determination.

In Example 53, the subject matter of Examples 51-52 includes, wherein the condition of the operating environment comprises a fog, rain, or snow event.

In Example 54, the subject matter of Examples 51-53 includes, wherein determining the condition of the operating environment of the vehicle comprises determining the condition of the operating environment using a visible light camera to capture image data and analyzing the image data to determine the condition.

In Example 55, the subject matter of Examples 51-54 includes, wherein determining the condition of the operating environment of the vehicle comprises determining the condition of the operating environment using a light ranging sensor to capture image data and analyzing the image data to determine the condition.

In Example 56, the subject matter of Examples 51-55 includes, wherein the audio excitation includes a frequency and a pattern, wherein at east one of the frequency or pattern are randomly assigned to the vehicle.

In Example 57, the subject matter of Example 56 includes, wherein the frequency is in an audible frequency range.

In Example 58, the subject matter of Examples 56-57 includes, wherein the frequency is within a range of about 20 hertz to 20,000 hertz.

Example 59 is a method of using sound navigation ranging in a vehicle to augment other sensing systems, the method comprising: determining a condition of an operating environment of the vehicle using a sensing system that is not sound navigation ranging; activating the sound navigation ranging based on the condition of the operating environment; generating an audio excitation from a speaker installed in the vehicle, the generation of the audio excitation in response to the sound navigation ranging being activated; receiving a reflection, the reflection being the audio excitation after being reflected from an object external to the vehicle, the reflection corresponding to the audio excitation; and analyzing the reflection to determine a location or a range of the object with respect to the vehicle.

In Example 60, the subject matter of Example 59 includes, wherein determining the condition of the operating environment and activating the sound navigation ranging based on the condition of the operating environment comprises: using a machine learning classifier to process sensor data with a classification, the sensor data including image data, and the machine learning classifier to return a probability of a result of the classification; determining that the probability of the result is lower than a threshold; and activating the sound navigation ranging based on the determination.

In Example 61, the subject matter of Examples 59-60 includes, wherein the condition of the operating environment comprises a fog, rain, or snow event.

In Example 62, the subject matter of Examples 59-61 includes, wherein determining the condition of the operating environment of the vehicle comprises determining the condition of the operating environment using a visible light camera to capture image data and analyzing the image data to determine the condition.

In Example 63, the subject matter of Examples 59-62 includes, wherein determining the condition of the operating environment of the vehicle comprises determining the condition of the operating environment using a light ranging sensor to capture image data and analyzing the image data to determine the condition.

In Example 64, the subject matter of Examples 59-63 includes, wherein the audio excitation includes a frequency and a pattern, wherein at least one of the frequency or pattern are randomly assigned to the vehicle.

In Example 65, the subject matter of Example 64 includes, wherein the frequency is in an audible frequency range.

In Example 66, the subject matter of Examples 64-65 includes, wherein the frequency is within a range of about 20 hertz to 20,000 hertz.

Example 67 is at least one machine-readable medium including instructions, which when executed by a machine, cause the machine to perform operations of any of the methods of Examples 59-66.

Example 68 is an apparatus comprising means for performing any of the methods of Examples 59-66.

Example 69 is an apparatus for using sound navigation ranging in a vehicle to augment other sensing systems, the apparatus comprising: means for determining a condition of an operating environment of the vehicle using a sensing system that is not sound navigation ranging; means for activating the sound navigation ranging based on the condition of the operating environment; means for generating an audio excitation from a speaker installed in the vehicle, the generation of the audio excitation in response to the sound navigation ranging being activated; means for receiving a reflection, the reflection being the audio excitation after being reflected from an object external to the vehicle, the reflection corresponding to the audio excitation; and means for analyzing the reflection to determine a location or a range of the object with respect to the vehicle.

In Example 70, the subject matter of Example 69 includes, wherein the means for determining the condition of the operating environment and activating the sound navigation ranging based on the condition of the operating environment comprise: means for using a machine learning classifier to process sensor data with a classification, the sensor data including image data, and the machine learning classifier to return a probability of a result of the classification; means for determining that the probability of the result is lower than a threshold; and means for activating the sound navigation ranging based on the determination.

In Example 71, the subject matter of Examples 69-70 includes, wherein the condition of the operating environment comprises a fog, rain, or snow event.

In Example 72, the subject matter of Examples 69-71 includes, wherein the means for determining the condition of the operating environment of the vehicle comprises means for determining the condition of the operating environment using a visible light camera to capture image data and analyzing the image data to determine the condition.

In Example 73, the subject matter of Examples 69-72 includes, wherein the means for determining the condition of the operating environment of the vehicle comprises means for determining the condition of the operating environment using a light ranging sensor to capture image data and analyzing the image data to determine the condition.

In Example 74, the subject matter of Examples 69-73 includes, wherein the audio excitation includes a frequency and a pattern, wherein at east one of the frequency or pattern are randomly assigned to the vehicle.

In Example 75, the subject matter of Example 74 includes, wherein the frequency is in an audible frequency range.

In Example 76, the subject matter of Examples 74-75 includes, wherein the frequency is within a range of about 20 hertz to 20,000 hertz.

Example 77 is at least one machine-readable medium including instructions for using sound navigation ranging in a vehicle to augment other sensing systems, the instructions when executed by a machine, cause the machine to perform the operations comprising: determining a condition of an operating environment of the vehicle using a sensing system that is not sound navigation ranging; activating the sound navigation ranging based on the condition of the operating environment; generating an audio excitation from a speaker installed in the vehicle, the generation of the audio excitation in response to the sound navigation ranging being activated; receiving a reflection, the reflection being the audio excitation after being reflected from an object external to the vehicle, the reflection corresponding to the audio excitation; and analyzing the reflection to determine a location or a range of the object with respect to the vehicle.

In Example 78, the subject matter of Example 77 includes, wherein determining the condition of the operating environment and activating the sound navigation ranging based on the condition of the operating environment comprises: using a machine learning classifier to process sensor data with a classification, the sensor data including image data, and the machine learning classifier to return a probability of a result of the classification; determining that the probability of the result is lower than a threshold; and activating the sound navigation ranging based on the determination.

In Example 79, the subject matter of Examples 77-78 includes, wherein the condition of the operating environment comprises a fog, rain, or snow event.

In Example 80, the subject matter of Examples 77-79 includes, wherein determining the condition of the operating environment of the vehicle comprises determining the condition of the operating environment using a visible light camera to capture image data and analyzing the image data to determine the condition.

In Example 81, the subject matter of Examples 77-80 includes, wherein determining the condition of the operating environment of the vehicle comprises determining the condition of the operating environment using a light ranging sensor to capture image data and analyzing the image data to determine the condition.

In Example 82, the subject matter of Examples 77-81 includes, wherein the audio excitation includes a frequency and a pattern, wherein at east one of the frequency or pattern are randomly assigned to the vehicle.

In Example 83, the subject matter of Example 82 includes, wherein the frequency is in an audible frequency range.

In Example 84, the subject matter of Examples 82-83 includes, wherein the frequency is within a range of about 20 hertz to 20,000 hertz.

Example 85 is at least one machine-readable medium including instructions that, when executed by processing circuitry, cause the processing circuitry to perform operations to implement of any of Examples 1-84.

Example 86 is an apparatus comprising means to implement of any of Examples 1-84.

Example 87 is a system to implement of any of Examples 1-84.

Example 88 is a method to implement of any of Examples 1-84.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for audio events detection in a vehicle, the system comprising:
an audio processor to receive audio data, the audio data sensed by a microphone array installed on the vehicle;
a camera installed on the vehicle;
a speaker installed on the vehicle;
processing circuitry to:
analyze the audio data using a machine learning technique to detect and recognize a sound event, wherein to analyze the audio data includes to determine that the sound event represents a verbal call to an operator of the vehicle by a person outside of the vehicle;
in response to a successful recognition of the sound event from the audio data:
determine, based on the analysis of the audio data, whether the verbal call relates to a safety condition;
in response to a determination that the verbal call relates to the safety condition, cause a vehicle control device to change a trajectory of the vehicle; and
cause the vehicle to emit a communication to the person outside of the vehicle;
in response to an unsuccessful recognition of the sound event from the audio data, identify or label the audio data as containing the sound event from a user input; and
in response to the audio data being labeled as containing the sound event, use the labeled audio data to identify a similar sound event in a subsequent classification;
a vehicle interface to:
transmit a message to a vehicle control system, the message based on the sound event.

2. The system of claim 1, wherein in response to a successful recognition of the sound event from the audio data, the processing circuitry causes the audio processor to toggle off at least one microphone in the microphone array while the communication is emitted to the person outside of the vehicle, wherein the vehicle emits the communication to the person outside of the vehicle through the speaker, wherein the at least one microphone is toggled off while the communication is emitted to the person outside of the vehicle through the speaker, wherein the sound event represents a critical event, wherein when the sound event represents a critical event, the vehicle interface transmits a second message via a network to an external entity, and wherein the external entity is at least one of: a local law enforcement agency, an emergency roadside assistance service, an emergency health service, or an emergency contact.

3. The system of claim 1, wherein the machine learning technique comprises an artificial neural network.

4. The system of claim 1, wherein transmitting the message comprises transmitting the message using a Controller Area Network bus.

5. The system of claim 1, wherein the vehicle control system performs a responsive action based on the message.

6. The system of claim 5, wherein the responsive action comprises an autonomous vehicle maneuver.

7. The system of claim 5, wherein the responsive action comprises displaying an alert to an occupant of the vehicle.

8. The system of claim 5, wherein the responsive action comprises transmitting a distress call to an emergency response entity.

9. The system of claim 5, wherein the responsive action comprises initiating a person identification routine, the person identification routine to determine an identity of a person associated with the audio data.

10. The system of claim 9, wherein the audio processor is to cause the transmission of a directed audio signal to the person associated with the audio data.

11. A method for audio events detection in a vehicle, the method comprising:
receiving audio data, the audio data sensed by a microphone array installed on the vehicle;
analyzing the audio data using a machine learning technique to recognize a sound event, wherein analyzing the data includes to determining that the sound event represents a verbal call to an operator of the vehicle by a person outside of the vehicle;
in response to a successful recognition of the sound event from the audio data:
determining, based on analyzing the audio data, whether the verbal call relates to a safety condition;
in response to determining that the verbal call relates to the safety condition, causing a vehicle control device to change a trajectory of the vehicle; and
causing the vehicle to emit a communication to the person outside of the vehicle;
in response to an unsuccessful recognition of the sound event from the audio data in the audio data, identify or label the audio data as containing the sound event from a user input, and wherein, in response to the audio data being labeled as containing the sound event, the machine learning technique is updated with the labeled audio data to identify a similar sound event in a subsequent classification; and
transmitting a message to a vehicle control system, the message based on the sound event.

12. The method of claim 11, wherein at least one microphone in the microphone array is toggled off while the communication is emitted to the person outside of the vehicle, wherein the vehicle emits the communication to the person outside of the vehicle through a speaker installed on the vehicle, wherein the at least one microphone is toggled off while the communication is emitted to the person outside of the vehicle through the speaker, and wherein the machine learning technique comprises a support vector machine.

13. The method of claim 11, wherein transmitting the message comprises transmitting the message using a Controller Area Network bus.

14. The method of claim 11, wherein the vehicle control system performs a responsive action based on the message.

15. The method of claim 14, wherein the responsive action comprises an autonomous vehicle maneuver.

16. The method of claim 14, wherein the responsive action comprises displaying an alert to an occupant of the vehicle.

17. The method of claim 14, wherein the responsive action comprises transmitting a distress call to an emergency response entity.

18. The method of claim 14, wherein the responsive action comprises initiating a person identification routine, the person identification routine to determine an identity of a person associated with the audio data.

19. The method of claim 18, further comprising transmitting a directed audio signal to the person associated with the audio data.

20. At least one machine-readable medium including instructions for audio events detection in a vehicle, the instructions when executed by a machine, cause the machine to perform operations comprising:

receiving audio data, the audio data sensed by a microphone array installed on the vehicle;

analyzing the audio data using a machine learning technique to recognize a sound event, wherein analyzing the data includes determining that the sound event represents a verbal call to an operator of the vehicle by a person outside of the vehicle;

in response to a successful recognition of the sound event from audio data:

determining, based on analyzing the audio data, whether the verbal call relates to a safety condition;

in response to determining that the verbal call relates to the safety condition, causing a vehicle control device to change a trajectory of the vehicle; and cause the vehicle to emit a communication to the person outside of the vehicle;

in response to an unsuccessful recognition of the sound event from audio data, identify or label the audio data as containing the sound event from a user input, and wherein, in response to the audio data being labeled as containing the sound event, the machine learning technique is updated with the labeled audio data to identify a similar sound event in a subsequent classification; and transmitting a message to a vehicle control system, the message based on the sound event.

21. The at least one machine-readable medium of claim 20, wherein at least one microphone in the microphone array is toggled off while the communication is emitted to the person outside of the vehicle, wherein the vehicle emits the communication to the person outside of the vehicle through a speaker installed on the vehicle, wherein the at least one microphone is toggled off while the communication is emitted to the person outside of the vehicle through the speaker, wherein the sound event represents a critical event, wherein when the sound event represents a critical event, a vehicle interface transmits a second message via a network to an external entity, and wherein the external entity is at least one of: a local law enforcement agency, an emergency roadside assistance service, an emergency health service, or an emergency contact.

22. The at least one machine-readable medium of claim 20, wherein the vehicle control system performs a responsive action based on the message.

23. The at least one machine-readable medium of claim 22, wherein the responsive action comprises an autonomous vehicle maneuver.

\* \* \* \* \*